(12) United States Patent
Pan (10) Patent No.: US 7,008,268 B2
(45) Date of Patent: Mar. 7, 2006

(54) SIM CARD SOCKET AND METHOD FOR MANUFACTURING THE SAME

(75) Inventor: Long-Jyh Pan, Taipei (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 10/886,878

(22) Filed: Jul. 8, 2004

(65) Prior Publication Data

US 2005/0009375 A1 Jan. 13, 2005

(30) Foreign Application Priority Data

Jul. 10, 2003 (TW) .............................. 92118816 A (51) Int. Cl.
*H01R 24/00* (2006.01)
(52) U.S. Cl. ...................................... 439/630; 439/326
(58) Field of Classification Search .................. 439/55, 439/630, 326; 235/441
See application file for complete search history.

(56) References Cited

U.S. PATENT DOCUMENTS

| | | | |
|---|---|---|---|
| 5,224,873 A * | 7/1993 | Duffet et al. ................ | 439/326 |
| 5,226,826 A * | 7/1993 | Nillson et al. ................ | 439/72 |
| 6,761,575 B1 * | 7/2004 | Bricaud et al. ............. | 439/326 |
| 2003/0119364 A1 * | 6/2003 | Liu ............................ | 439/630 |
| 2005/0064748 A1 * | 3/2005 | Zheng et al. ................ | 439/150 |
| 2005/0070171 A1 * | 3/2005 | Zheng et al. ................ | 439/700 |

* cited by examiner

*Primary Examiner*—Hae Moon Hyeon
(74) *Attorney, Agent, or Firm*—Quintero Law Office (57) ABSTRACT

A SIM card socket and method for manufacturing the same. The SIM card socket includes a base, a first engaging member, and a second engaging member. The base includes a first side and a second side opposite thereto. The first engaging member is fixed on the first side of the base. The second engaging member is disposed on the second side of the base in an elastically deformable manner. The manufacturing method includes the following steps. A conductive base with a plurality of protrusions is provided. An isolating member is formed on the conductive base, and the protrusions are partially covered by the isolating member. The protrusions are cut so as to not connect with each other.

16 Claims, 11 Drawing Sheets

SIM CARD SOCKET AND METHOD FOR MANUFACTURING THE SAME

BACKGROUND OF THE INVENTION

1. Field of the Invention

The invention relates to a SIM (subscriber identification module) card socket for an electronic device and a manufacturing method thereof, and in particular, to a SIM card socket manufactured by a simplified process.

2. Description of the Related Art

Mobile phones have become so popular that one user may have several mobile phones using one SIM card that may be shared between different mobile phones. A convenient method of removing and installing the SIM card is in mobile phone is important. The conventional methods for holding the SIM card can be substantially divided into two types: a fixed type and a moveable type. Since the moveable type is un-related to the invention, its description is omitted.

To fix the SIM card in the SIM card socket, a surface, formed with pads, of the SIM card is firstly aligned with a surface, formed with contacts, of a body of the mobile phone. The SIM card is then pushed to a predetermined position on the body. Furthermore, after a battery thereof is combined with the body of the mobile phone, the SIM card can be fixed by a rib on the battery to prevent dislodging.

The SIM card often cannot be fixed in the conventional SIM card socket without application of another device such as the battery, as above. In view of this, another conventional SIM card socket that can hold the SIM card by itself has been provided. Its structure, however, must be coordinated with a housing of the mobile phone so that the entire process for manufacturing the mobile phone becomes complicated.

SUMMARY OF THE INVENTION

In view of this, the invention provides an electronic device including a SIM card socket with a simplified structure.

Another purpose of the invention is to provide a SIM card socket providing convenience for insertion and removal.

Still another purpose of the invention is to provide a method for manufacturing the SIM card socket using a simplified process Accordingly, the invention provides a SIM card socket including a base, a first engaging member, and a second engaging member. The base includes a first side and a second side opposite thereto. The first engaging member is fixed on the first side of the base. The second engaging member is disposed on the second side of the base in an elastically deformable manner.

In a preferred embodiment, the second engaging member includes a connecting portion and a holding portion. The connecting portion is connected to the second side of the base. The holding portion is integrally formed on the connecting portion, and may be cantilevered to move relative to the base.

It is noted that the first engaging member and the second engaging member may be integrally formed on the base.

In another preferred embodiment, the SIM card socket further includes an isolation member, a first elastic members, and a plurality of second elastic members. The isolation member is disposed on the base, and may be made of plastic. The first elastic member is integrally formed on the base. The second elastic members are disposed in the isolation member respectively.

In another preferred embodiment, the base further includes a third side, a fourth side, and two walls. The is fourth aide is opposite to the third side. The walls are formed on the third side and the fourth side respectively.

In the invention, a method for manufacturing a SIM card socket is provided. The method includes the following steps. A conductive base with a plurality of protrusions is provided. An isolating member is formed on the conductive base, and the protrusions are partially covered by the isolating member. The protrusions are cut so as to not connect with each other.

In another preferred embodiment, the method further includes the following step. After the isolation member is formed on the conductive base, the protrusions are press molded into an inverted-V shape.

It is noted that the thickness of the isolation member is adjusted according to an angle at which the protrusion is bent.

In another preferred embodiment, the method further includes the following step. After the isolation member is formed on the conductive base, the conductive base is bent so as to form a first engaging member, a second engaging member, an elastic member, and a wall. The first engaging member, the second engaging member, the elastic member, and the wall are all formed by pressing the base.

In another preferred embodiment, the protrusions are formed in the conductive base by cutting, extending in the same direction thereon. Alternatively, part of the is protrusions extends in a first direction, and the other part of the protrusions extends in a second direction opposite to the first direction.

It is noted that the isolation member is disposed on the conductive base by injection molding.

In the invention, an electronic device is provided. The electronic device includes a body, a SIM card socket, and a SIM card. The body includes a connector, and the SIM card socket is disposed on the body. The SIM card is disposed in the SIM card socket in a manner such that the SIM card is coupled to the connector. The SIM card socket includes a base, a first engaging member, and a second engaging member. The base includes a hollow portion, a first side, and a second side opposite to the first side. The connector is connected to the SIM card so socket via the hollow portion. The first engaging member is fixed on the first side of the base so as to hold the SIM card. The second engaging member is disposed on the second side of the base in an elastically deformable manner so as to hold the SIM card. The SIM card is easily disposed into or removed from the SIM card socket by means of the second engaging member deforming.

In another preferred embodiment, the base further includes a fixed portion connecting the connector. The fixed portion is formed with a hole, and the connector is formed with a block corresponding to the hole. The SIM card socket is fixed on the connector by insertion of the block into the hole.

BRIEF DESCRIPTION OF THE DRAWINGS

The present invention can be more fully understood by reading the subsequent detailed description and examples with references made to the accompanying drawings, wherein:

FIG. 8b is a side view of the assembled electronic device in FIG. 8a.

DETAILED DESCRIPTION OF THE INVENTION

First Embodiment

Figure 1A:
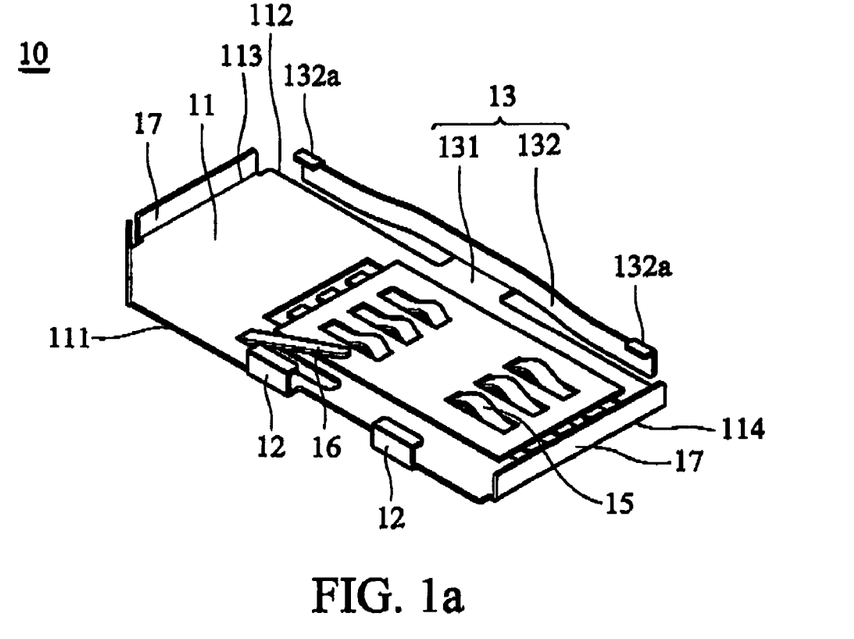
FIGS. 1a–1b are schematic views of a SIM card socket as disclosed in a first embodiment of the invention.
Figure 1B:
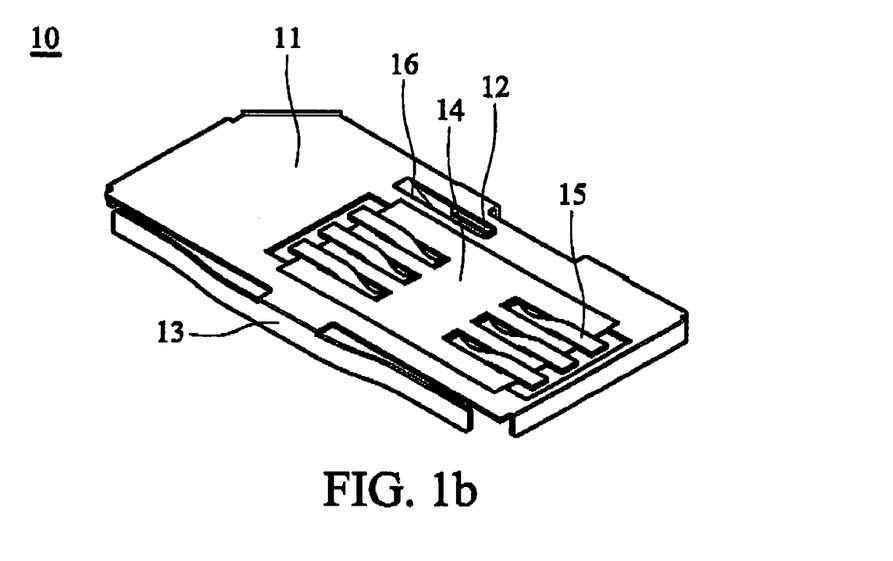

FIGS. 1a–1b show a SIM card socket 10 as disclosed in a first embodiment of the invention. In this embodiment, the SIM card socket 10 includes a base 11, two first engaging members 12, a second engaging member 13, an isolation member 14, a first elastic member 18, six second elastic members 15, and two walls 17.

The base 11 is conductive, and is used as a basic component of the SIM card socket 10. The base 10 includes a first side 111, a second side 112 opposite to the first side 111, a third side 113, and a fourth side 114 opposite to the third aide 113.

Each the first engaging member 12 is integrally formed on the first side 111 of the base 11, and is formed like a hook. Also, the first engaging members 12 are fixed relative to the base 11 so that the first engaging members 12 are fixed on the first side 111 of the base 11. The second engaging member 13 is disposed on the second side 112 of the base 11 in an elastically deformable manner, and includes a connecting portion 131 and a holding portion 132. The connecting portion 131 is connected to the second side 112 of the base 11. The holding portion 132 is integrally formed on the connecting portion 131, and may be cantilevered to move relative to the base 11. Also, the holding portion includes two hooks 132a.

The isolation member 14 is disposed on the base 11, and may be made of isolation material such as plastic. Each second elastic member 15 is disposed and held in the isolation member 14 respectively, and is separated by the isolation member 14 to prevent the second elastic members 15 from electrically connecting each other. The second elastic members 15 may be electrically connected to pads (no shown) on a SIM card 200 (shown in FIG. 4a) disposed in the SIM card socket 10, acting as contacts.

The first elastic member 16 is integrally formed on the base 11. The walls 17 are formed on the third side 113 and the fourth side 114 of the base 11 respectively.

Figure 2A:
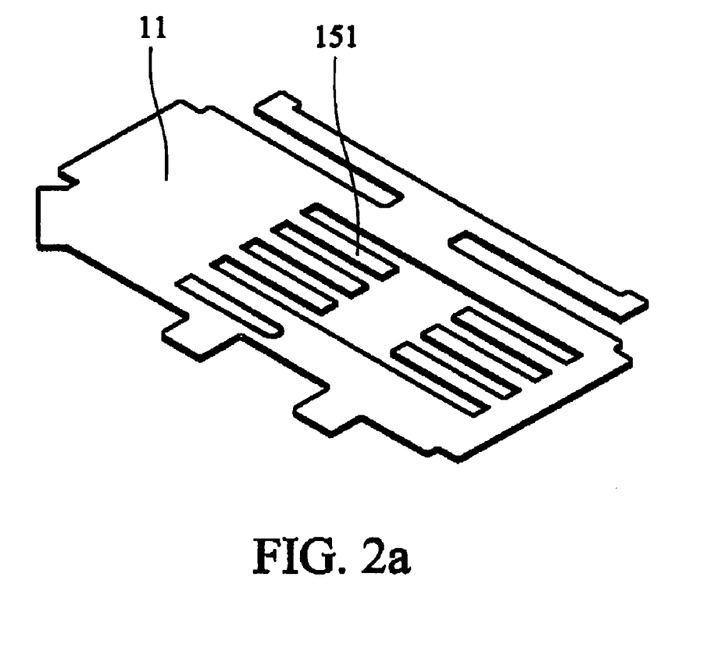
FIGS. 2a–2d are schematic views showing a method for manufacturing the SIM card socket in FIGS. 1a–1b.
Figure 2B:
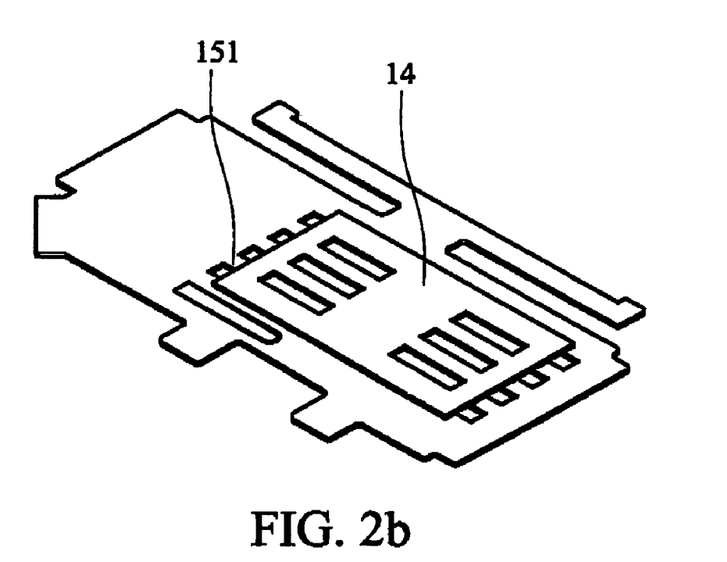
Figure 2C:
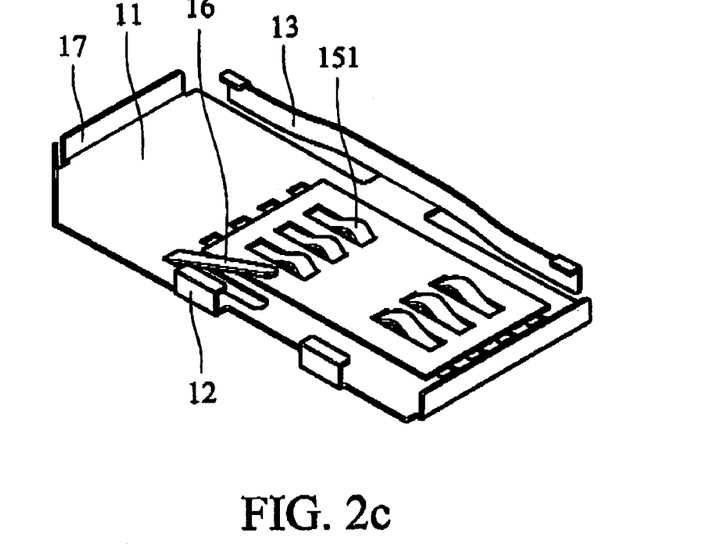
Figure 2D:
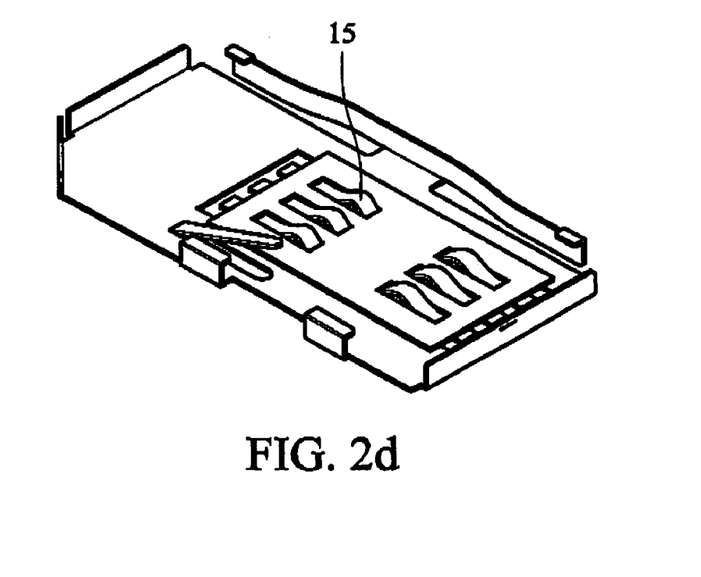

FIGS. 2a–2d are schematic views showing a method for manufacturing the SIM card socket of this embodiment. In this embodiment, the method includes the following steps. The conductive base 11 is firstly provided, and is formed by cutting via a press so as to include a plurality of protrusions 151 as shown in FIG. 2a. The isolating member 14 is then formed on the conductive bass 11 by injection molding so that the protrusions 151 are partially covered by the isolating member 14 as shown in FIG. 2b. The protrusions 151 are subsequentially press molding into an inverted-V shape. At the same time, the conductive base 11 is bent so as to form the first engaging members 12, the second engaging member 13, the first elastic member 16, and the walls 17 by press molding as shown in FIG. 2c. The protrusions 151 are finally cut so as to not connect each other, to form the second elastic members 15 as shown in FIG. 2d.

It is noted that the thickness of the isolation member 14 is adjustable according to an angle at which the protrusion 151 is bent. A detailed description follows.

Manufacture of the SIM card socket 10 of the embodiment is simple, and the thickness of the SIM card socket 10 can be minimized.

Figure 3:
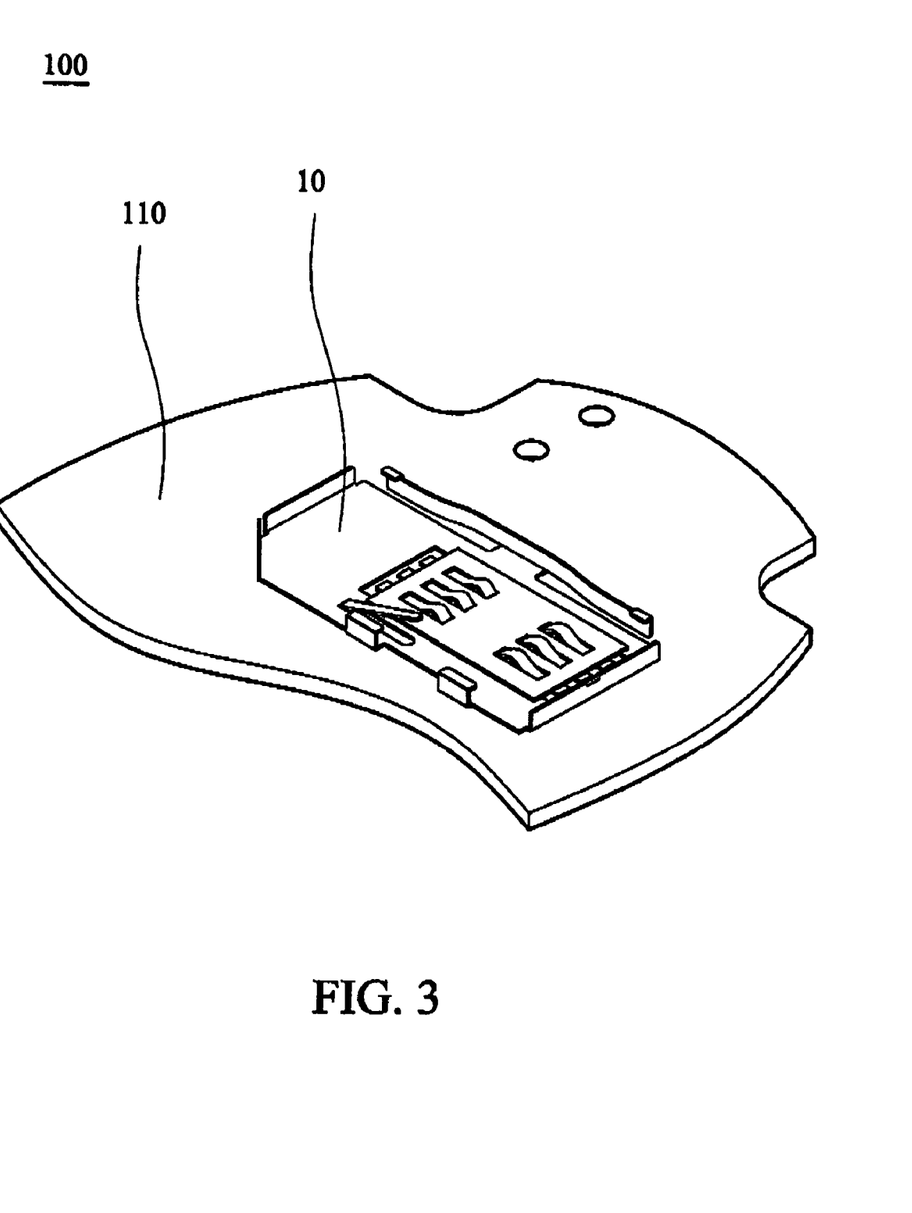
FIG. 3 is a schematic view of an electronic device with the SIM card socket in FIGS. 1a–1b.

FIG. 3 is a schematic view of an electronic device 100 with the SIM card socket 10 of this embodiment. The is SIM card socket 10 is disposed on a body 110 of the electronic device 100. Referring to FIG. 3, assembly of the SIM card socket 10 of this embodiment on the electronic device 100 is simplified, since the body 110 of the electronic device 100 does not include any additional devices coordinating with the SIM card socket 10.

Figure 4A:
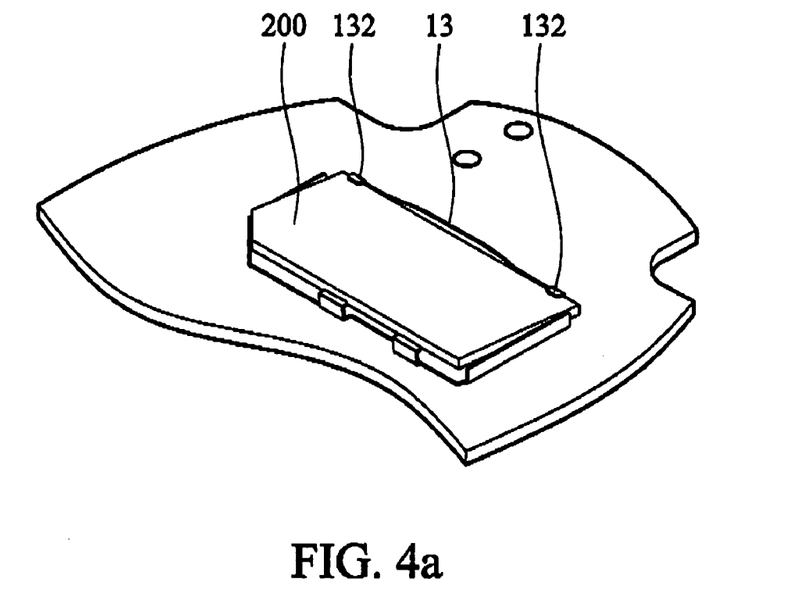
FIGS. 4a–4d are schematic views showing a manner for inserting a SIM card into the electronic device in FIG. 3.
Figure 4B:
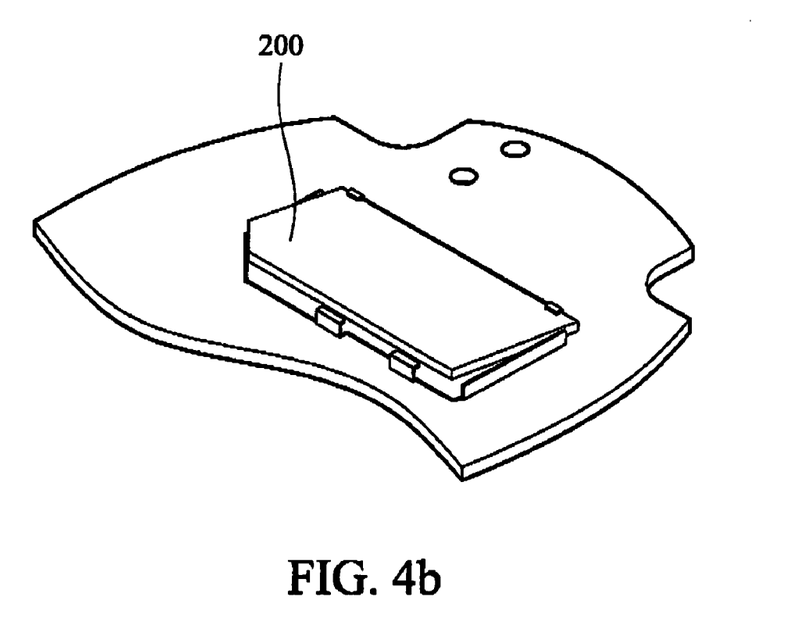
Figure 4C:
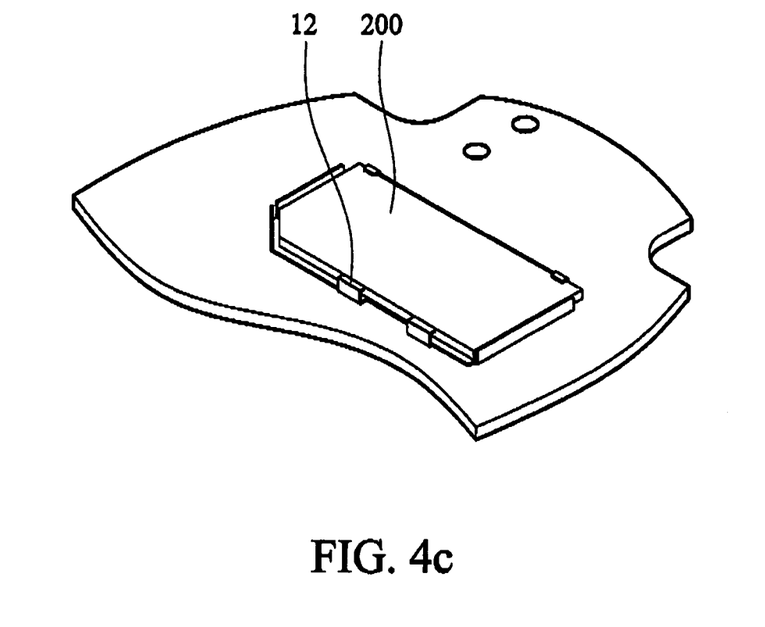
Figure 4D:
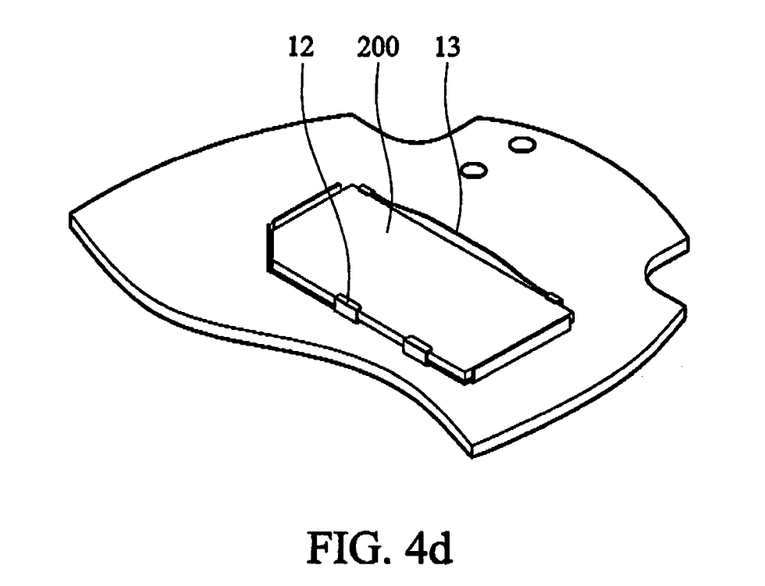

To insert the SIM card 200 into the SIM card socket 10 of the electronic device 100, one side of the SIM card 200 first abuts by the second engaging portion 13 as shown in FIG. 4a. The SIM card 200 is then moved toward the second engaging portion 13 as shown in FIG. 4b. The other side, near the first engaging portions 12, of the SIM card 200 is subsequentially pressed downward as shown in FIG. 4c. The SIM card 200 is finally engaged with the first portion 12 as shown in FIG. 4d by the elastic force of the second engaging portion 13.

To remove the SIM card 200 from the SIM card socket 10 of the electronic device 100, the SIM card 200 is firstly moved toward the second engaging portion 13 to disengage from the first engaging portions 12. At this time, the SIM card 200 is lifted upwardly by the first elastic member 16, and is removed.

By means of the SIM card socket 10 of this embodiment, the SIM card 200 is conveniently disposed in the electronic device 100. Furthermore, when the electronic device 100 is assembled with the SIM card socket 10 of this embodiment, manufacture is simplified with no need for additional devices to coordinate with the SIM card socket 10.

Second Embodiment

Figure 5A:
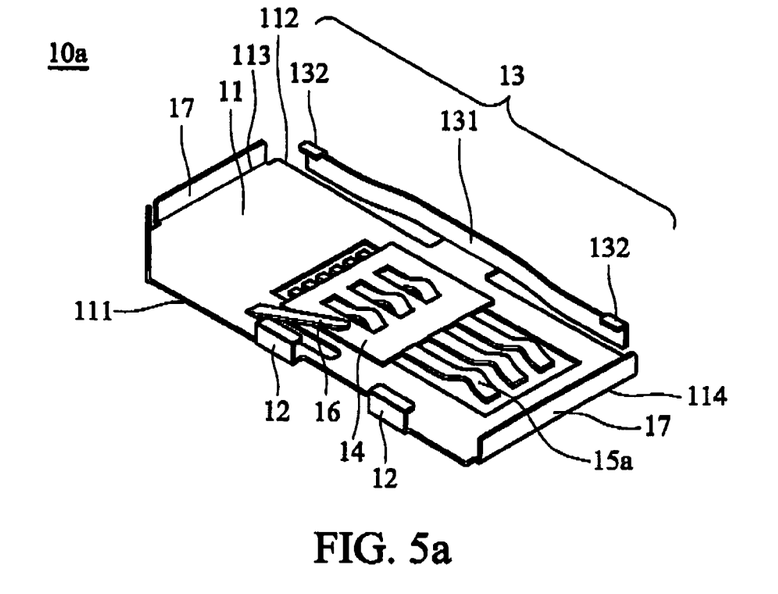
FIGS. 5a–5b are schematic views of a SIM card socket as disclosed in a second embodiment of the invention.
Figure 5B:
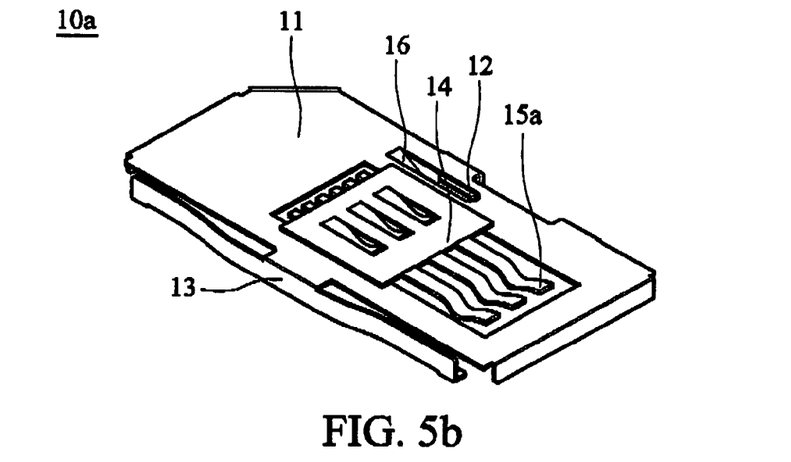

FIGS. 5a–5b show a SIM card socket 10a as disclosed in a second embodiment of the invention. In this embodiment, the SIM card socket 10a includes a base 11, two first engaging members 12, a second engaging member 13, an isolation member 14, a first elastic member 16, six second elastic members 15, and two walls 17. The components of this embodiment same as those of the first embodiment are given the similar labels, and their description is omitted.

This embodiment differs from the first embodiment in that all of the second elastic members 15a (protrusions) extend in the same direction on the base 11, unlike the scheme of first embodiment where three of the second elastic members 15 extending in a first direction and the other three in a second direction opposite to thereto.

By means of the second elastic members 15a, it is more convenient to manufacture the SIM card socket. Additionally, when the protrusions are bent to form the second elastic members 15a, the angles thereof are adjustable as required.

Figure 6A:
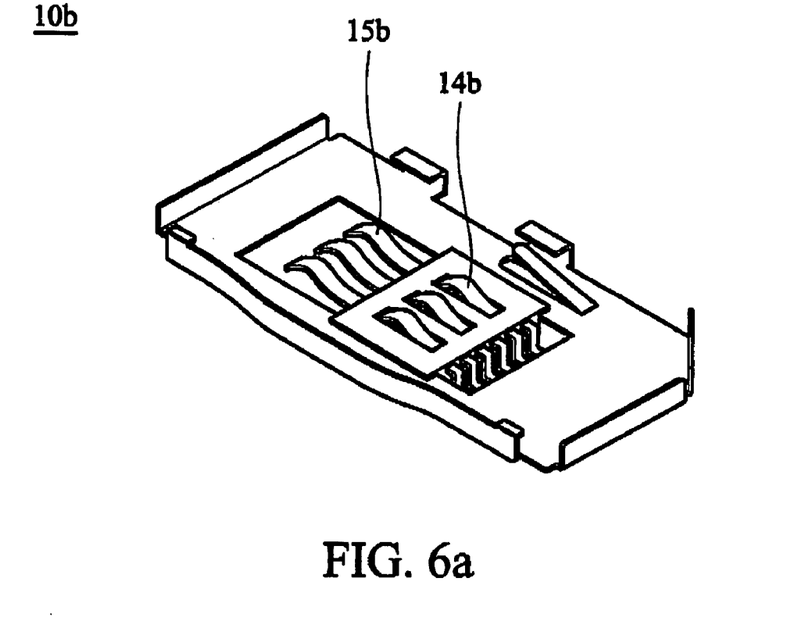
FIGS. 6a–6b are schematic views showing a variation of the SIM card socket in FIGS. 5a–5b.
Figure 6B:
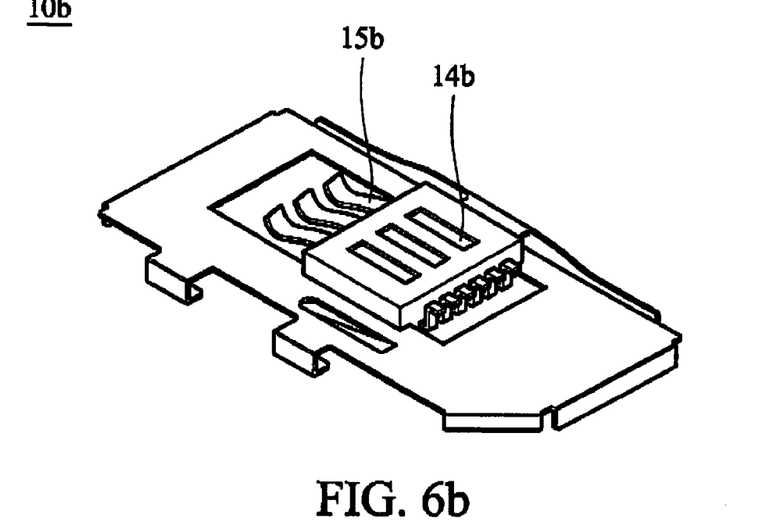

Referring to FIGS. 6a–6b, since all of second elastic members 15b extend in the same direction on the base 11, the angle of the second elastic members 15b is adjustable as required. Thus, the thickness of an isolation member 14b can be increased. As a result, the SIM card socket 10b with the thicker isolation member 14b is more easily manufactured.

Third Embodiment

Figure 7A:
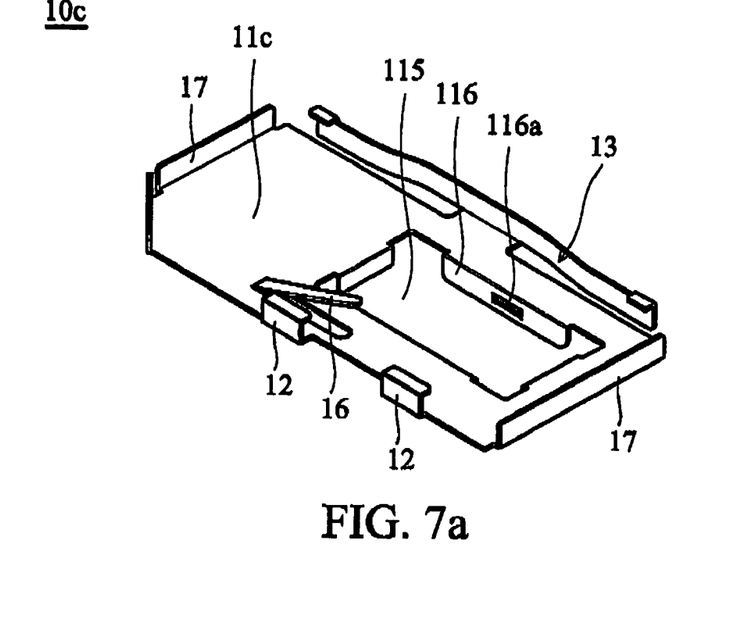
FIGS. 7a–7b are schematic views of a SIM card socket as disclosed in a third embodiment of the invention.
Figure 7B:
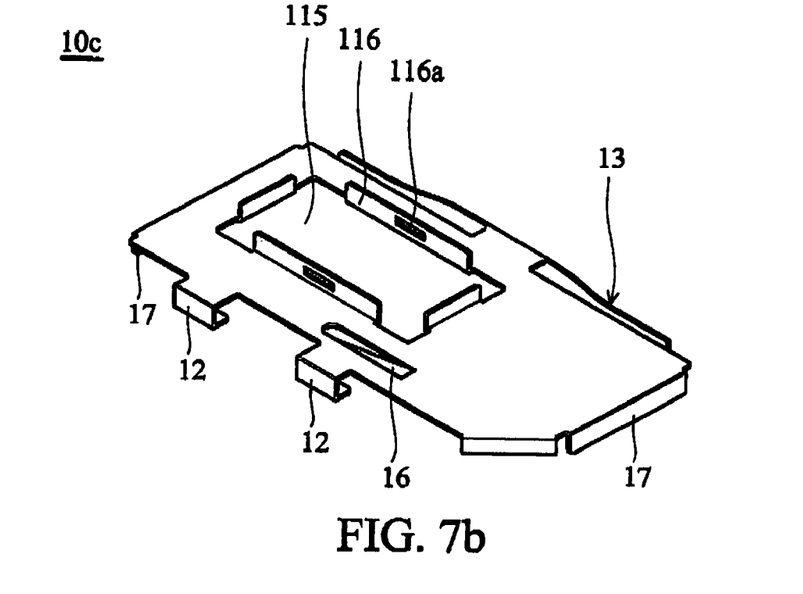

FIGS. 7a–7b show a SIM card socket 10c as disclosed in a third embodiment of the invention. In this embodiment, the SIM card socket 10c includes a base 11c, two first engaging members 12, a second engaging member 13, an elastic member 16, and two walls 17. It is noted that the components of this embodiment same as those of the first embodiment are given the similar labels, and their description is omitted.

This embodiment differs from the first embodiment in that the SIM card socket 10c of this embodiment does not include elastic contact members.

The base 11c includes a hollow portion 115 and a fixed portion 116. The fixed portion 116 is formed with a hole 116a.

Figure 8A:
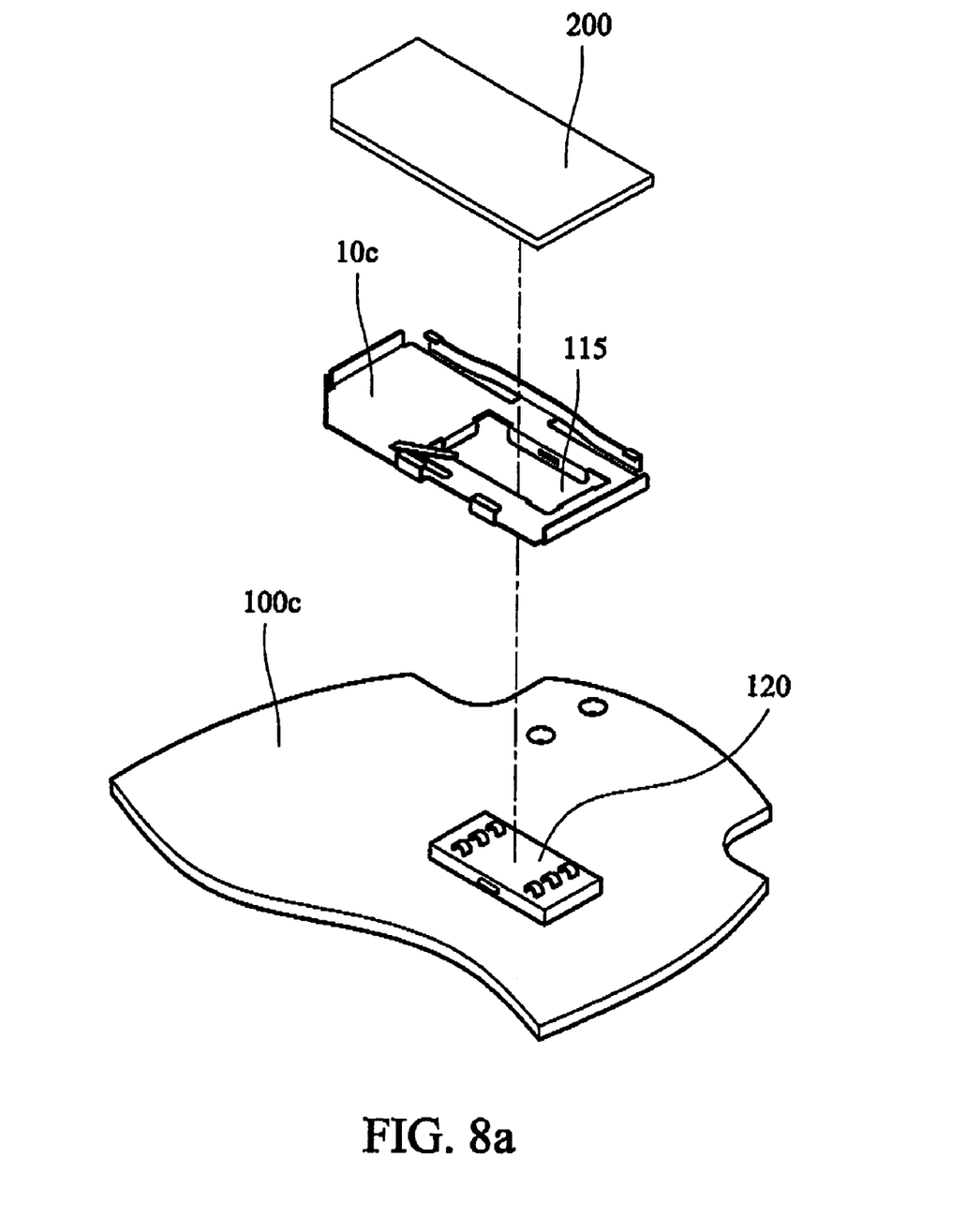
FIG. 8a is a schematic view of an electronic device with the SIM card socket in FIGS. 7a–7b.
Figure 8B:
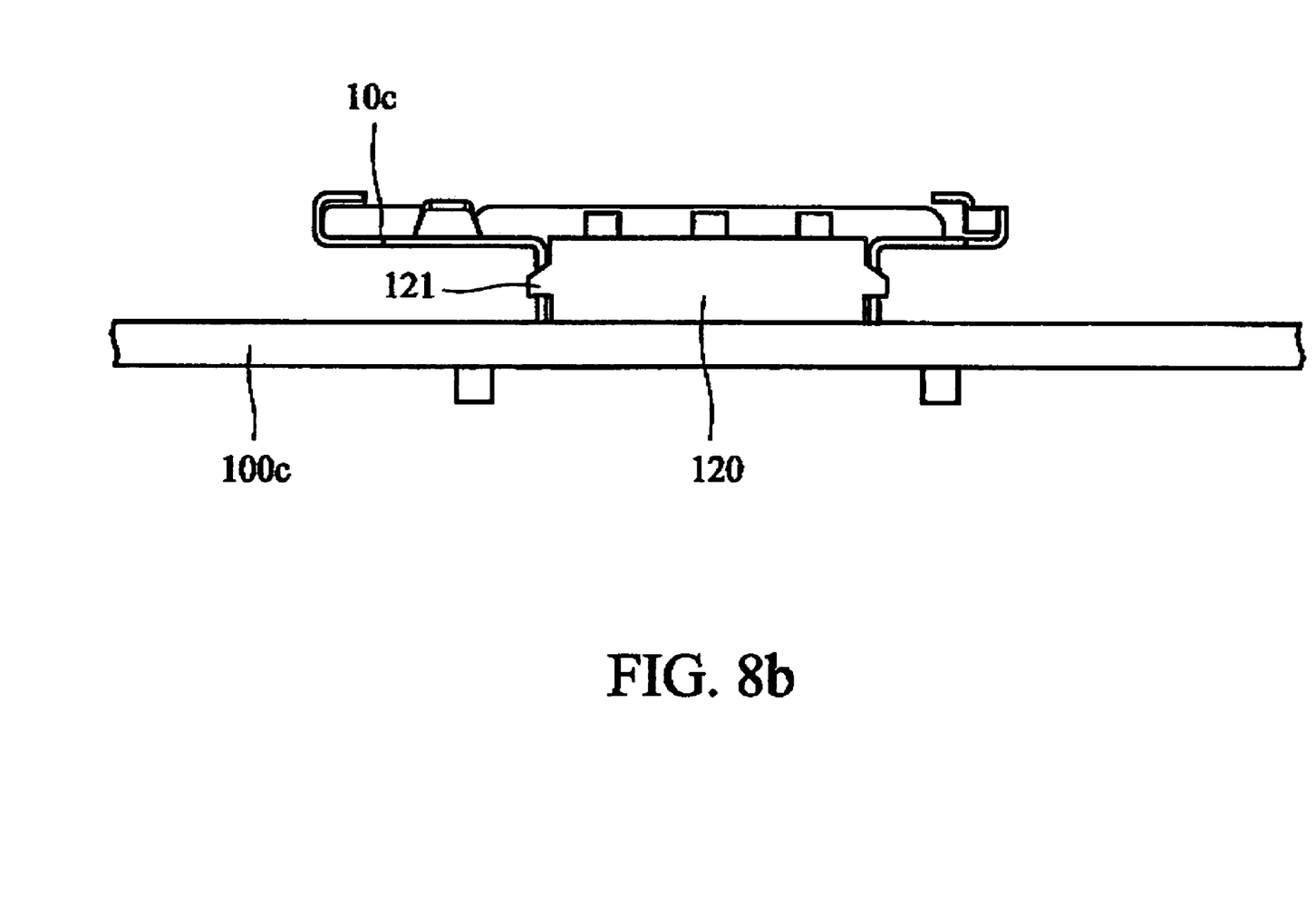

Referring to FIGS. 8a–8b, since the SIM card socket 10c of this embodiment does not include elastic contact members, an electronic device 100c, coordinated with the SIM card socket 10c, includes a connector 120 thereon. The connector 120 is formed with a block 121 corresponding to the hole 116a as shown in FIG. 8b. The SIM card socket 10c can be fixed on the connector 120 of the electronic device 100c by inserting the block 121 into the hole 116a.

As stated above, the SIM card socket 10c of this embodiment can be applied in an electronic device with a connector, and assembly thereof is very convenient. It is understood that the connector may be a SIM connector.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A subscriber identification module card socket for holding a subscriber identification module card, comprising:
   a base including a first side and a second side opposite to the first side;
   a first engaging member fixed on the first side of the base;
   a second engaging member disposed on the second side of the base in an elastically deformable manner; and
   a first elastic member, disposed on the base, lifting the subscriber identification module card up.

2. The subscriber identification module card socket as claimed in claim 1, wherein the second engaging member comprises:
   a connecting portion connected to the second side of the base; and
   a holding portion, integrally formed on the connecting portion, moving relative to the base.

3. The subscriber identification module card socket as claimed in claim 2, wherein the holding portion is cantilevered.

4. The subscriber identification module card socket as claimed in claim 1, wherein the first engaging member is integrally formed on the base.

5. The subscriber identification module card socket as claimed in claim 1, wherein the second engaging member is integrally formed on the base.

6. The subscriber identification module card socket as claimed in claim 1, further comprising:
   an isolation member disposed on the base; and
   a plurality of second elastic members disposed in the isolation member respectively.

7. The subscriber identification module card socket as claimed in claim 1, wherein the first elastic member is integrally farmed on the base.

8. The subscriber identification module card socket as claimed in claim 1, wherein the base further includes:
   a third side;
   a fourth side opposite to the third side; and
   two walls formed on the third side and the fourth side respectively.

9. An electronic device comprising:
   a body including a connector;
   a subscriber identification module card socket disposed on the body; and
   a subscriber identification module card disposed in the subscriber identification module card socket in a manner such that the subscriber identification module card is coupled to the connector;
   wherein the subscriber identification module card socket includes:
     a base including a hollow portion, a first side, and a second side opposite to the first side, wherein the connector is located in the hollow portion and connected to the SIM subscriber identification module card;
     a first engaging member, fixed on the first side of the base, holding the subscriber identification module card;
     a second engaging member, disposed on the second side of the base in an elastically deformable manner, for further holding the subscriber identification module card, wherein the second engaging member is deformable such that the subscriber identification module card is easily disposed into or removed from the subscriber identification module card socket; and
     an elastic member, integrally formed on the base, lifting the subscriber identification module card up.

10. The electronic device as claimed in claim 9, wherein the second engaging member comprises:
    a connecting portion connected to the second side of the base; and
    a holding portion, integrally formed on the connecting portion, moving relative to the base.

11. The electronic device as claimed in claim 10, wherein the holding portion is cantilevered.

12. The electronic device as claimed in claim 9, wherein the first engaging member is integrally formed on the base.

13. The electronic device as claimed in claim 9, wherein the second engaging member is integrally formed on the base.

14. The electronic device as claimed in claim 9, wherein the base further includes:
    a third side;
    a fourth side opposite to the third side; and
    walls formed on the third side and the fourth side respectively.

15. The electronic device as claimed in claim 9, wherein the base further includes a fixed portion combining with the connector.

16. The electronic device as claimed in claim 15, wherein the fixed portion is formed with a hole, the connector is farmed with a block corresponding to the hole, and the subscriber identification module card socket is fixed to the connector by inserting the block into the hole.

* * * * *